| United States Patent [19] | [11] 4,029,843 |
|---|---|
| Shah et al. | [45] June 14, 1977 |

[54] POLYMERIC RELEASE AGENTS

[75] Inventors: Jaykumar Jivraj Shah, Wheeling; Jules Downes Porsche, Oakbrook; Charles Bartell, Highland Park, all of Ill.

[73] Assignee: Borden, Inc., Columbus, Ohio

[22] Filed: Jan. 15, 1976

[21] Appl. No.: 649,227

[52] U.S. Cl. .................................. 428/352; 260/15; 260/49; 260/271; 428/40; 428/343; 428/461; 428/480; 428/509; 428/510; 428/500; 428/518; 428/523

[51] Int. Cl.$^2$ .......................................... C09J 7/02

[58] Field of Search ............ 428/352, 343, 40, 524, 428/523, 480, 500, 354, 463, 461, 516, 518, 509, 510; 526/15, 49, 271

[56] References Cited

UNITED STATES PATENTS

| 2,876,894 | 3/1959 | Dahlquist | 428/352 |
|---|---|---|---|
| 3,052,566 | 9/1969 | Smith | 428/352 |
| 3,240,330 | 3/1966 | Christmas | 428/352 |
| 3,475,196 | 10/1969 | Bartell | 428/352 |
| 3,928,690 | 4/1976 | Settineri | 428/343 |

*Primary Examiner*—Ellis Robinson
*Attorney, Agent, or Firm*—Daniel D. Mast; George P. Maskas; George A. Kap

[57] ABSTRACT

Improved high temperature and high humidity resistant release agents for pressure sensitive tapes are provided. Reaction products of (1) a polyanhydride resin and (2) water or an amine or an alcohol are applied as a thin coating to the tape to permit easy unwinding of the tape, even though it may have been stored at elevated temperature or humidity.

9 Claims, No Drawings

POLYMERIC RELEASE AGENTS

This invention relates to improved pressure sensitive tape and specifically to tapes having a release agent that makes it possible to unroll the tape even though the roll has been exposed to high temperature and high humidity conditions before use.

BACKGROUND OF THE INVENTION

Most prior release agents used on tape have failed because they have a low softening point. For instance, when paraffin wax is applied directly to tape as a release coating or when it is applied as an emulsion that leaves a coating of wax, a product that cannot withstand high temperature storage may be produced. The wax softens and flows so that an effective release coat is no longer present between layers of the tape. In addition, conventional release agents have tended to migrate into the adjoining adhesive layer with the result that adhesiveness and tack are lost in storage and the tape is unusable.

Conventional silicone base release agents have also been unsatisfactory. In addition to their high cost, some of these agents cause loss of adhesion and tack upon aging that results from the tape being exposed to high temperature and/or high humidity.

Moisture has likewise deleteriously affected the release agent while the tape is stored with the result that high unwind forces may be required or a loss of adhesiveness in the tape may be encountered.

SUMMARY OF THE INVENTION

It is an object of the invention to provide new and improved agents and a method of applying them to pressure sensitive tape.

It is an object to provide improved pressure sensitive tapes that retain good unwind properties even though stored at high temperature and/or at high humidity.

It is a further object to provide improved release liners of paper and plastic film.

The objects of the invention have been achieved by discovery of a group of new chemical compounds that can be applied in extremely thin layers to tape to provide the necessary releasing mechanism which is required in a roll of tape, or in a release liner such as one of paper. The invention will be more easily understood by reference to specific embodiments which follow.

The chemicals used include compositions obtained by mixing a copolymer of approximately 1 mole of an alpha olefin such as n-hexene-1, n-octadecene-1, and approximately 1 mole of a dicarboxylic anhydride such as maleic anhydride, itaconic anhydride, citraconic anhydride, etc. with water, an alcohol or an amine, and heating such reaction mixture to form the corresponding dicarboxylic acid or the monocarboxylic half ester or half amide derivative. It is not necessary that all the anhydride units be converted. A desirable product is formed when half or more of the anhydride units have been reacted. A typical segment of the new polymeric structures is shown in FIG. 1.

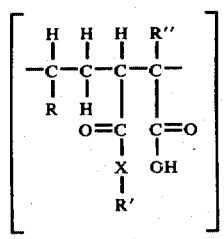

FIG. 1.

Where
R is a straight chain alkyl group with 4 to 22 carbon atoms,
R' is H or a straight chain alkyl group with 1 to 22 carbon atoms;
R" is H or $CH_3$;
X is NH or O.
Either R or R' must contain at least 12 carbon atoms.

A specific example is the reaction product of a copolymer of an alpha olefin and an unsaturated aliphatic dicarboxylic acid anhydride with an amine to form about 90 to 95% of the half amide type of release agent shown in FIG. 2.

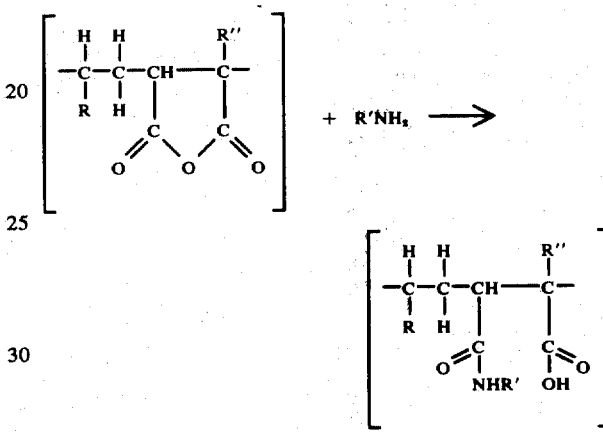

FIG. 2.

Where
R is a straight chain alkyl group having 4 to 22 carbon atoms,
R' is H or a saturated straight chain alkyl group having 1 to 22 carbon atoms;
R" is H or $CH_3$.

1:1 copolymers of alpha-olefins and maleic anhydride are available from Gulf Oil Chemicals Company. These copolymers are linear, low molecular weight, thermoplastic solids sold as Gulf Polyanhydride Resins.

It is important that the olefin monomer used in synthesizing the copolymer contains a straight chain alkyl group of at least 4 carbon atoms in order to obtain proper release coat properties. The preferred alkyl chain length is 10 to 20 atoms in length.

It is also important that, when a polyanhydride resin made with an olefin containing less than 16 carbon atoms is used, a reactant, either an alcohol or an amine having a normal alkyl chain of at least 10 to 22 carbon atoms, should be reacted with the polymer. Thus, for example, if a n-hexene-1/maleic anhydride copolymer is used, the alcohol or the amine should contain a straight chain alkyl group having 12 to 22 carbon atoms, e.g. dodecyl alcohol or amine, octadecyl alcohol or amine, or docosanyl alcohol or amine.

The water, amines, and the alcohols are employed in the formation of a corresponding acid, half amide or half ester. At least one mole of water, amine or alcohol per dicarboxylic anhydride unit is required. A slight excess of water, alcohol or amine improves the yield but no more than 2 moles can be used to advantage. One and one-half moles is preferred.

The general reaction procedure for making these release agents involves first dissolving the alpha olefin/-dicarboxylic acid anhydride copolymer in a suitable warm solvent. The chosen alcohol, water or amine is added to the warm solution under constant agitation, and then maintained under refluxing conditions at elevated temperature for about three to five hours in which time the anhydride ring opens and forms the corresponding carboxylic acid or half ester or half amide. The solution is cooled to room temperature. The release agent is precipitated from this solution by pouring it into cold anhydrous methanol and the product is recovered by filtration.

The release agents described in the above syntheses are soluble in a wide variety of solvents such as toluene, isopropyl alcohol, methyl ethyl ketone, ethyl acetate, etc. These release agents are insoluble in aliphatic hydrocarbon solvents such as heptane. However, use of a 10% polar solvent such as isopropyl alcohol with heptane makes the release agents readily soluble even at room temperature.

Colloidal dispersions or emulsions of these release agents can be formed by making a morpholine salt and emulsifying one or more of these release agents in water. The emulsions can be coated on substrates and dried. This method is less expensive and causes no fire hazard.

It has been discovered that an extremely thin coating of any of these release agents can be conveniently formed by coating a substrate such as one mil polyester film with a dilute solution of the release agent using an applicator such as a Mayer bar and then drying the solution of said release agent, leaving a clear, colorless hard film having a weight of about one pound per 20,000 square yards and a thickness of the order of a millionth of an inch on the substrate. The usual backing materials for making tapes can be used. These backings include paper, aluminum foil, copper foil, polypropylene film, polyvinyl chloride film, polyethylene, cellulose acetate film, polyester film, coated and uncoated cloth and others.

A mass of any standard pressure sensitive adhesive, e.g. either a rubber-resin type of an acrylic type is coated, dried, and if necessary, cured on the opposite side of the web. If necessary, a primer can be applied before coating with the layer of pressure sensitive adhesive.

Having been coated with the release agent, the primer and the pressure sensitive adhesive, the finished tape is wound into rolls and slit by conventional methods. The tape is then subjected to the standard Pressure Sensitive Tape Council test procedures. These tests are made after storing rolls for 12 days at room temperature, 12 days at 120° F, and 7 days at 100° F, and 100% relative humidity storage, and in some applications for 7 days at 140° F.

PREFERRED EMBODIMENTS

Example I 25 grams of n-octadecene-1/maleic anhydride copolymer, obtained from Gulf Oil Chemicals Company and known as PA-18 polyanhydride resin* was charged into a three-necked 500 ml reaction flask with 60 grams of toluene and 15 grams of MEK to make a 25% polymer solution. 5 ml of water per 100 grams of the above solution were added and the mixture was refluxed at 70°–74° C for 5 hours. At the end of 5 hours, the solution was allowed to cool to room temperature. A sample of this cooled solution was withdrawn and subjected to I.R. analysis. It was found that 80 to 90% of the anhydride groups were hydrolyzed. PA-18 could not be 100% hydrolyzed under these conditions even after 17 hours reaction time so that the product was an n-octadecene-1/maleic anhydride-maleic acid terpolymer. Its softening and melting point was 124°–126° C.

*See Gulf Polyanhydride Resins Product Information Bulletin CD-91, 5/71.

Example II 18.4 grams of n-hexene-1/maleic anhydride copolymer (Gulf PA-6-polyanhydride resin) was added to 300 ml tetrahydro furan in a three-necked glass reaction flask. The resin was dissolved at 40° C with agitation. Then, with constant agitation, 40.3 grams of octadecyl amine was added slowly and dissolved in the above solution. The temperature was then raised to 60°–65° C and the solution was refluxed at this temperature for three hours. At the end of 3 hours, the solution was cooled and poured into 600 ml of anhydrous methanol with constant agitation. A white waxy solid was formed. The solution was allowed to stand for a few minutes after which the clear, supernatant liquid was decanted. The waxy solid was washed once with anhydrous methanol and was converted to a white granular solid which was collected on a filter and air dried. The melting point of the half n-octadecyl amide derivative was 172°–176° C and the chemical nature of reaction product was confirmed by the I.R. analysis.

Example III 35.6 grams of n-octadecene-1/maleic anhydride copolymer (Gulf PA-18 polyanhydride resin) was added to 300 ml of tetrahydro furan in a three-necked glass reaction flask. The resin was dissolved under constant agitation at 40° C. 40.3 grams of octadecyl amine was slowly added and dissolved under constant agitation. Then, the temperature was raised to 60°–65° C and the solution was refluxed at this temperature for 3 hours. At the end of 3 hours, the solution was cooled and poured into 600 ml of anhydrous methanol with constant agitation. A white waxy solid was formed. The solution was allowed to stand for a few minutes after which the clear liquid was decanted. The waxy solid was washed once more with anhydrous methanol, which converted the wax into a white granular solid. This solid was collected on a filter and dried. The melting point of the half amide derivative was 158°–162° C and the chemical nature of reaction product was confirmed by I.R. analysis.

2% solutions of each of the release agents described in Examples I, II and III were prepared in toluene. Each was applied using a No. 4 Mayer bar to a one mil polyester film having a permanently tacky, pressure sensitive, rubber-resin adhesive* on the reverse side. A primer coat** was used beneath the pressure sensitive adhesive.

*The standard pressure sensitive adhesive as a top coat referred to above has the following formulation:

| | Parts |
|---|---|
| Pale Crepe Rubber | 100 |
| Oil Soluble Heat Reactive Phenolic Resin | 20 |
| Metal Salt of Modified Dispersing Resin | 10 |

-continued

| | Parts |
|---|---|
| Penta Erythritol Ester of Hydrogenated Rosin | 50 |
| Anti-oxidant | 2 |

**The standard primer coat referred to above has the following formulation:

| | Parts |
|---|---|
| Styrene-Butadiene (GRS) Rubber | 50 |
| Butadiene-Acrylonitrile Hycar Rubber | 50 |
| Coumarone Indene Resin | 75 |

The tapes were slit into 1 inch × 60 yard rolls and were tested for adhesion to steel, 90° tack, and unwind force at 1'/minute, 60'/minute, and 160'/minute, according to the procedure described by the Pressure Sensitive Tape Council. The sample rolls were stored 12 days at room temperature, twelve days at 120° F and seven days at 100° F and 100% relative humidity. The values obtained were reported in ounces per inch. The results of the physical testing on the rolls after storage are described in Table 1.

TABLE I
EFFECT OF STORAGE ON THE PROPERTIES OF TAPES IN EXAMPLES I, II, AND III

| | EXAMPLE I | EXAMPLE II | EXAMPLE III |
|---|---|---|---|
| Panel Adhesion, oz./in. | | | |
| After 12 days R.T.* Storage | 38 | 41 | 37 |
| After 12 days 120° F Storage | 37 | 43 | 42 |
| After 7 days 100° F & 100% Relative Humidity Storage | 38 | 41 | 37 |
| 90° Tack, oz./in. | | | |
| After 12 days R.T. Storage | 21 | 28 | 23 |
| After 12 days 120° F Storage | 19 | 26 | 21 |
| After 7 days 100° F & 100% Relative Humidity Storage | 18 | 27 | 19 |
| Unwind Force oz./in. at 1 ft./min. speed | | | |
| After 12 days R.T. Storage | 25 | 28 | 27 |
| After 12 days 120° F Storage | 27 | 34 | 34 |
| After 7 days 100° F & 100% Relative Humidity Storage | 27 | 35 | 30 |
| Unwind Force, oz./in. at 60 ft./min. speed | | | |
| After 12 days R.T. Storage | 13 | 11 | 13 |
| After 12 days 120° F Storage | 17 | 19 | 25 |
| After 7 days 100° F & 100% Relative Humidity Storage | 16 | 15 | 18 |
| Unwind Force, oz./in. at 160 ft./min. speed | | | |
| After 12 days R.T. Storage | 12 | 9 | 11 |
| After 12 days 120° F Storage | 16 | 17 | 21 |
| After 7 days 100° F & 100% Relative Humidity Storage | 12 | 10 | 13 |

*Room Temperature

Example IV 35.6 Grams of n-octadecene-1/maleic anhydride (Gulf PA-18 Polyanhydride resin) was added to 300 ml of toluene in a three-necked glass reaction flask. The resin was dissolved under constant agitation at 40° C. Then 40.3 grams of octadecyl alcohol obtained from Ashland Chemical Company and known as Adol 62 was slowly added into the above warm solution. The Adol 62 has 95% $C_{18}$ alkyl groups and 5% $C_{16}$ alkyl groups. The mixed solution was heated to 90°–95° C temperature and was refluxed for 5 hours. At the end of the reaction period the solution was cooled to room temperature. A dry white granular product was extracted in the same manner as described in Examples II and III. The resulting release agent had a softening and melting point of 95°–97° C. The I.R. analysis showed that extensive esterification had occurred in the 5 hour reaction period.

A 2% solution of this copolymer in toluene was coated on 1 mil polyester film using a No. 4 Mayer bar. A polyacrylate pressure-sensitive adhesive was applied to the reverse side of the film, dried, and cured. The tape was slit into 1 inch by 60 yard rolls and the sample rolls were subjected to storage in the same manner as described previously in Examples I, II, and III. In addition, samples of this tape were also subjected to storage at 140° F for 7 days. The results of the physical testing on the rolls after storage are described in Table II.

TABLE II
EFFECT OF STORAGE ON THE PROPERTIES OF TAPE IN EXAMPLE IV

| | |
|---|---|
| Panel Adhesion, oz./in. | |
| After 12 days R.T. Storage | 32 |
| After 12 days 120° F Storage | 34 |
| After 7 days 100° F, 100% Relative Humidity Storage | 32 |
| After 7 days 140° F Storage | 30 |
| 90° Tack, oz./in. | |
| After 12 days R.T. Storage | 17 |
| After 12 days 120° F Storage | 18 |
| After 7 days 100° F & 100% Relative Humidity Storage | 17 |
| After 7 days 140° F Storage | 17 |
| Unwind Force, oz./in. at 1 ft./min. speed | |
| After 12 days R.T. Storage | 21 |
| After 12 days 120° F Storage | 23 |
| After 7 days 100° F & 100% Relative Humidity Storage | 20 |
| After 7 days 140° F Storage | 22 |
| Unwind Force, oz./in. at 60 ft./min. speed | |
| After 12 days R.T. Storage | 6 |
| After 12 days 120° F Storage | 7 |
| After 7 days 100° F, 100% Relative Humidity Storage | 12.5 |
| After 7 days 140° F Storage | 14 |
| Unwind Force, oz./in. at 160 ft./min. speed | |
| After 12 days R.T. Storage | 5 |
| After 12 days 120° F Storage | 4.5 |
| After 7 days 100° F & 100% Relative Humidity Storage | 8.5 |
| After 7 days 140° F Storage | 11 |

Although specific examples have been given, obvious variations and modifications can be made within the spirit and scope of the appended claims.

We claim:

1. In a tape having a pressure sensitive adhesive on one surface of the base strip of the tape, the improvement consisting of a layer of a polymeric release agent on the opposite surface of said base strip, said polymeric release agent having the following structural formula:

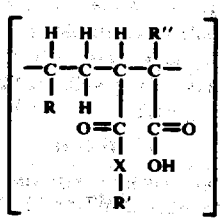

Wherein
R is a straight chain alkyl group with 4 to 22 carbon atoms,
R' is H or a straight chain alkyl group with 1 to 22 carbon atoms,
R'' is H or CH$_3$,
X is NH or O,
Either R or R' must contain at least 12 carbon atoms.

2. The tape of claim 1 wherein the polymeric release agent is a reaction product of a copolymer of an alpha olefin and an unsaturated aliphatic dicarboxylic acid anhydride with an amine to form a majority of the half amide type as follows:

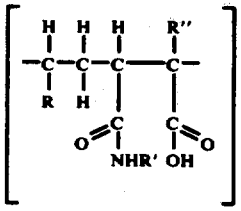

Wherein
R is a straight chain alkyl group having 4 to 22 carbon atoms,
R' is H or a saturated straight chain alkyl group having 1 to 22 carbon atoms,
R'' is H or CH$_3$.

3. The tape of claim 2 wherein the polymeric release agent is a reaction product of from about 90 to 95% the half amide type.

4. The tape of claim 1 wherein the polymeric release agent is a reaction product of (1) a copolymer formed by reacting an olefin with a dicarboxylic anhydride and (2) water to form the corresponding dicarboxylic acid.

5. The tape of claim 1 wherein the polymeric release agent is a reaction product of (1) a copolymer formed by reacting an olefin with a dicarboxylic anhydride and (2) an alcohol to form the corresponding monocarboxylic half ester.

6. The tape of claim 1 wherein the polymeric release agent is a reaction product of (1) a copolymer formed by reacting an olefin with a dicarboxylic anhydride and (2) an amine to form the corresponding half amide derivative.

7. The tape of claim 5 wherein the olefin is n-hexene-1 and the alcohol contains a straight chain alkyl group having 12 to 22 carbon atoms.

8. The tape of claim 6 wherein the olefin is n-hexene-1 and the amine contains a straight chain alkyl group having 12 to 22 carbon atoms.

9. A release liner comprising a backing sheet and on at least one surface of said sheet a layer of polymeric release agent, said polymeric release agent having the following structural formula:

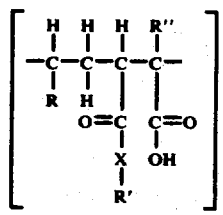

Wherein
R is a straight chain alkyl group with 4 to 22 carbon atoms,
R' is H or a straight chain alkyl group with 1 to 22 carbon atoms;
R'' is H or CH$_3$,
X is NH or O,
Either R or R' must contain at least 12 carbon atoms.

* * * * *